United States Patent [19]

Galloway et al.

[11] Patent Number: 4,679,645
[45] Date of Patent: Jul. 14, 1987

[54] MECHANICAL DEVICE FOR TRANSMITTING SIGNALS THROUGH A SWIVEL CONNECTION

[76] Inventors: James J. Galloway, 2309 Via Anacapa, Palos Verdes Estates, Calif. 90274; Anthony Madrigal, 655 N. Acacia, Reedley, Calif. 93654

[21] Appl. No.: 706,146

[22] Filed: Feb. 27, 1985

[51] Int. Cl.$^4$ .............................................. B60K 1/00
[52] U.S. Cl. .................................. 180/65.8; 188/1.11; 188/1.12; 200/DIG. 29; 187/9 E
[58] Field of Search ....................... 280/271; 180/65.8; 188/1.11, 1.12; 200/DIG. 29, 5 EA, 61.12, 61.87, 153 T, 161, 331; 16/35 R; 182/15, 17; 187/9 R, 9 E

[56] References Cited

U.S. PATENT DOCUMENTS

| | | | |
|---|---|---|---|
| 1,673,206 | 6/1928 | Safely | 200/61.89 |
| 3,384,725 | 5/1968 | Poch | 200/153 T |
| 3,409,105 | 11/1968 | Clinton | 188/1.12 |
| 3,636,586 | 1/1972 | Bollinger | 188/1.12 |
| 3,845,255 | 9/1974 | Zielke | 200/5 EA |
| 4,128,144 | 12/1978 | Vassar | 188/1.12 |
| 4,140,883 | 2/1979 | Zielke | 179/90 P |
| 4,167,657 | 9/1979 | Zielke | 200/5 EA |
| 4,210,787 | 7/1980 | Zielke | 200/5 EA |
| 4,248,445 | 2/1981 | Vassar | 188/1.12 |

Primary Examiner—John J. Love
Assistant Examiner—Richard Camby
Attorney, Agent, or Firm—John E. Wagner

[57] ABSTRACT

An electromechanical device for transmitting a binary ON-OFF or an analog signal through a rotary connection between two parts of a mechanical system. It is applicable to rotary connections in general but particularly as a warning system for work platforms which employ swivelable casters having operator actuated locks to prevent movement of the platform during work operations. The swivelable caster includes a lock or brake and means for engaging and disengaging the lock. The caster includes a hollow shaft which allows pivoting of the caster The shaft is journaled in the platform base and includes an axially extending actuator operated by the lock or brake actuator to operate an electrical switch carried by a work platform and mounted near the caster shaft for operation whenever the caster brake is engaged regardless of the swivel orientation. Discrete ball bearings are trapped in the hollow shaft and displaced by a wire cable moving between the trapped balls. In its most general form, a transducer on one side of a rotary swivel is actuated by an intermediate plunger which moves inside of a sleeve in a hollow axial shaft or king post. The plunger is moved by a wire or other flexible member which moves transverse to the axis and contacts the end of the plunger and displaces it. In elevating work platform safety, this device is used to sense whether or not a caster and the information is transmitted to safety circuits within the work platform itself.

8 Claims, 9 Drawing Figures

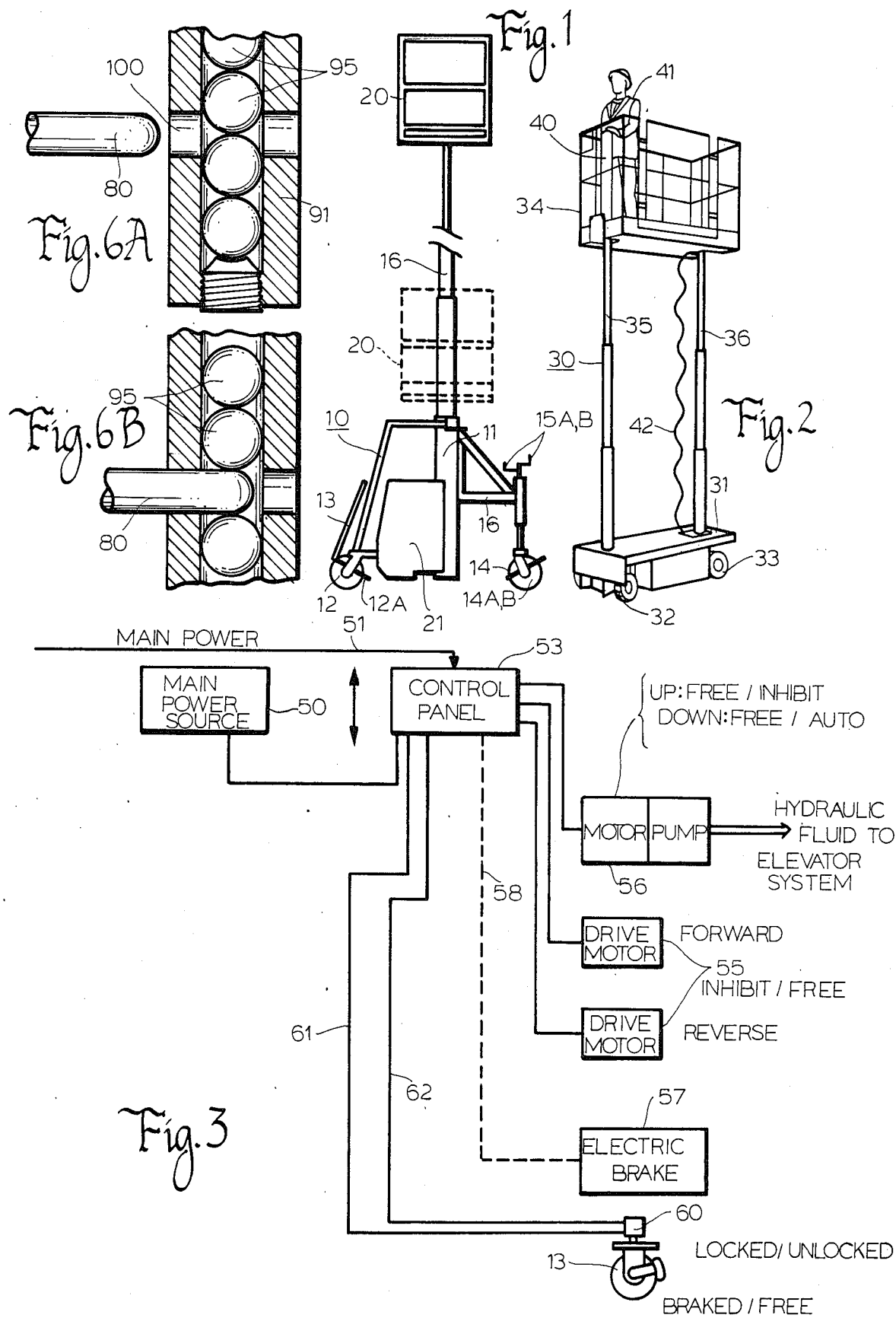

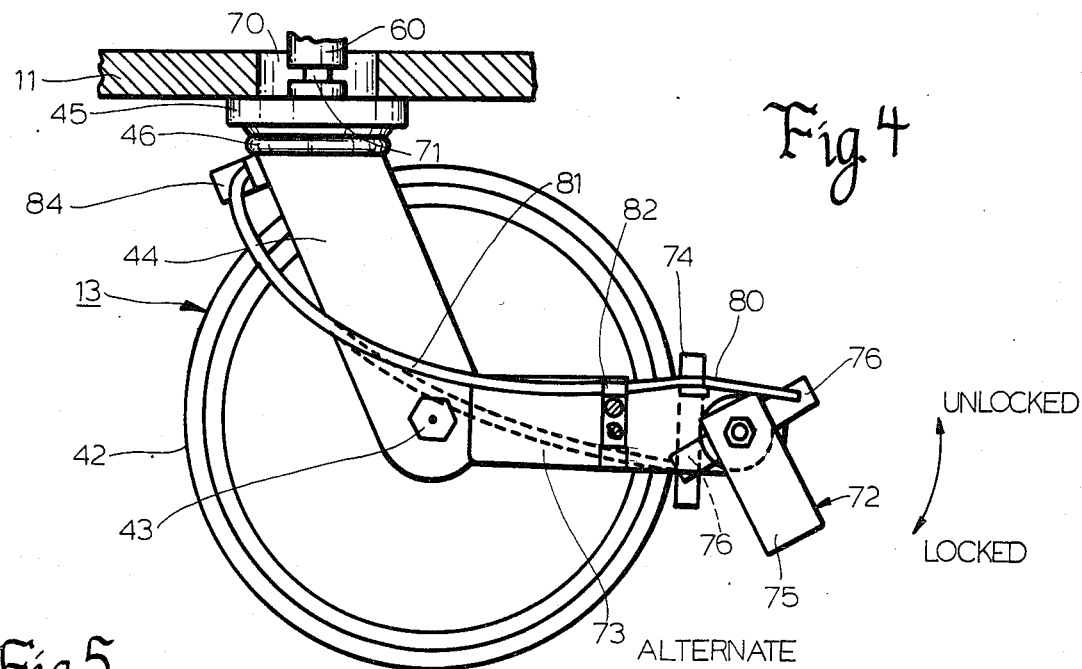
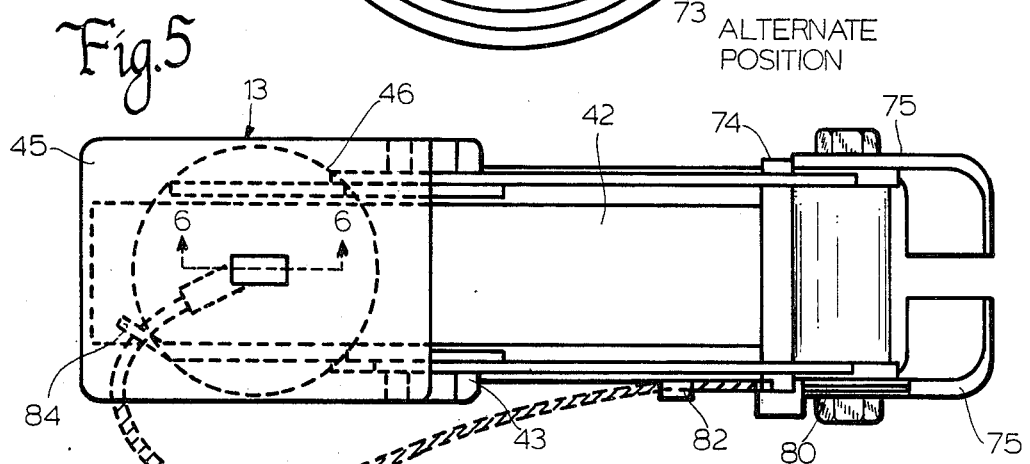
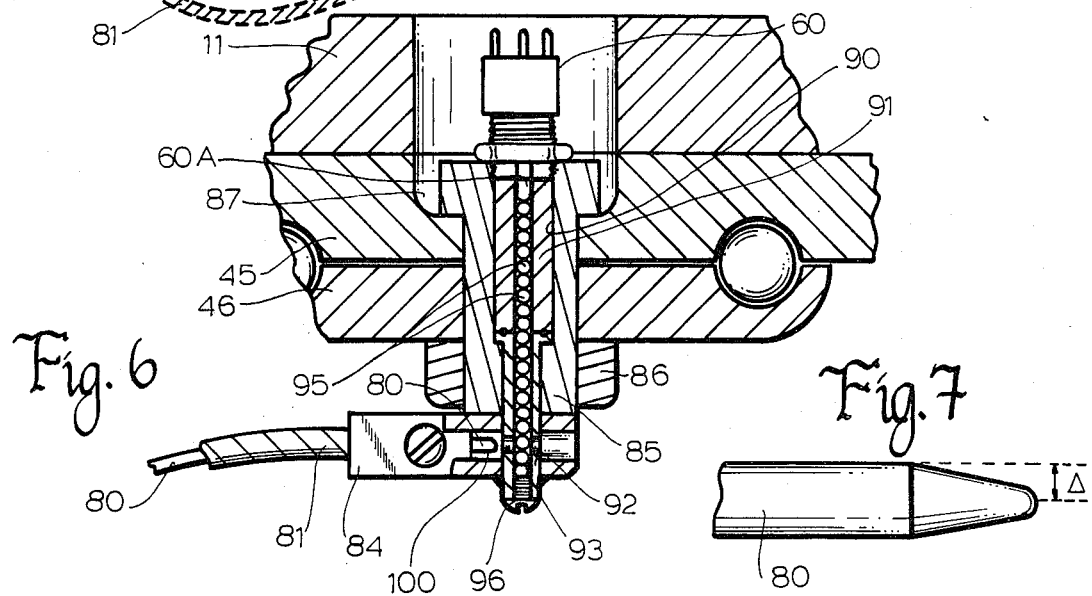

MECHANICAL DEVICE FOR TRANSMITTING SIGNALS THROUGH A SWIVEL CONNECTION

BACKGROUND OF THE INVENTION

The widespread use of the swivel mechanical couplings in devices ranging from spacecraft to automobiles and grocery carts has given rise to a generally widespread need for reliable, practical, low cost methods of transmitting signals through these devices. Coupling of the elements on either side of the swivel by flexible electrical, hydraulic or mechanical cables has not been practical, in many cases, because they will be damaged unless swivel movement is limited to a finite number, e.g. less than 360 degrees. This is often unacceptable. The use of electrical wipers is common in many applications and hydraulic swivels are also a well developed art. What has been lacking up until now is a practical low-cost electro-mechanical device with a configuration well suited for use on casters or steered swiveled wheels.

There is a particular need in the personnel lift industry for devices which convey signals through a rotating joint to be used in a warning or control interlock safety system to transmit information on the ON-OFF status of the brakes or wheel locks which are commonly mounted adjacent to the wheels. This information is sensed at the wheel and must be transmitted in some way to the body of the lift where it can be converted to electrical form for use in control circuitry.

Often a work platform may include a total of four casters, two of which are fixed for rolling in one direction and the other two being swivelable about vertical axes for steering. By judicial movement the presence of two swivelable casters is usually sufficient for required movement of the equipment. Often in work platforms, all four casters will be swivelable.

Similar needs arise in relation to other forms of equipment employing casters or steered or swivelable wheels, in particular where safety of human beings depends on a wheel being locked.

Examples of prior art locking casters are shown in the following patents:

U.S. Pat. No. 3,479,618, L. Maslow, Nov. 25, 1969
U.S. Pat. No. 3,636,586, Bollinger et al, Jan. 25, 1972
U.S. Pat. No. 3,751,758, Higbee et al, Aug. 14, 1973
U.S. Pat. No. 3,828,392, J. Bolger, Aug. 13, 1974
U.S. Pat. No. 4,037,291, Huempfner et al, July 26, 1977
U.S. Pat. No. 4,110,866, H. Ishii, Sept. 8, 1978
U.S. Pat. No. 4,119,156, Wheeler et al, Oct. 10, 1978
U.S. Pat. No. 4,128,144, H. P. Vassar, Dec. 5, 1978
U.S. Pat. No. 4,205,413, Collignon et al, June 3, 1980
U.S. Pat. No. 4,248,445, H. P. Vassar, Feb. 3, 1981
U.S. Pat. No. 4,269,424, J. L. Gray, May 26, 1981
U.S. Pat. No. 4,275,962, C. J. Aulik, July 7, 1981
U.S. Pat. No. 4,336,629, Jarvis et al, June 29, 1982
U.S. Pat. No. 4,336,630, L. A. Page, June 29, 1982
U.S. Pat. No. 4,349,937, F. J. Fontana, Sept. 21, 1982
U.S. Pat. No. 4,349,937, F. J. Fontana, Sept. 21, 1982.

In the Maslow patent the brake actuating mechanism operates through the pin of the caster. In the Vassar patent, a bead chain brake actuator extends through the pin of the caster.

In the automotive brake art, indicators have been used to signal brake actuation. Representative of such prior art are U.S. Pat. Nos. 1,673,206 to E. E. Safely issued June 12, 1928 and 2,914,930 to James V. Ralston, issued Nov. 24, 1959.

In the related keyboard art, trapped balls have been used to lock out all but one electrical circuit. Patents disclosing such mechanisms are:

Br. No. 331,619, L. M. Simpson, July 31, 1930
U.S. Pat. No. 3,845,255, A. Zielke, Oct. 29, 1974
U.S. Pat. No. 4,140,883, A. Zielke, Feb. 20, 1979
U.S. Pat. No. 4,167,657, A. Zielke, Sept. 11, 1979 and
U.S. Pat. No. 4,210,787, A. Zielke, July 1, 1980.

None of these patents recognize the need to signal locked or unlocked condition of a caster assembly and none provide the mechanism which will provide that function.

Even though not all types of elevating work platform lifts are required to have wheel brakes or locks under present law or industrial standards, it is considered that under certain conditions, operator safety may be significantly enhanced when such locks are present. Safety may be further enhanced when in LOCKED or UNLOCKED condition or an INTERMEDIATE position, the lock condition can be signalled to the operator. Better yet, if the elevator mechanism can be blocked during unlocked condition, even greater operator safety often results.

In conditions of operation on a sloping floor, some types of elevating work platforms may present a constant hazard to the operator and to those around him if the platform wheels are not appropriately locked prior to commencement of work or upon elevation of the work station. In some equipment, the brake systems are remotely lockable from the elevated work station but more often than not, they are simple mechanical brakes located at ground level, to be actuated by the operator before he mounts the platform or actuated by a co-worker on the ground.

Up to the present, we are unaware of the use of signal or interlock devices for brakes or swivel locks on the wheels of elevating work platforms. Prior to this invention there has not been a comparable reliable low-cost means of signaling lock condition through the swivel axis of wheels or casters and converting this information into a binary (switched) or analog (proportional) signal.

BRIEF DESCRIPTION OF THE INVENTION

Faced with the foregoing state of the art, we determined that an important objective in aiding safety in work platforms is the provision of a swivelable caster with lock information condition transmitted to the platform work station. We determined that this could be done via the caster shaft. We next set about to design an assembly in which the locked or unlocked condition of a caster lock (such as a brake or swivel lock) can be indicated regardless of the orientation of the swivel. We also found that lock condition information can be transmitted via the axis of the swivel to the interior of the platform Next we determined a desirable combination of elements including a flexible wire secured to an actuatable part of the lock and movable as an indication of the condition of the lock, i.e. LOCKED or UNLOCKED.

Next we sought to produce an assembly which is low in cost and reliable, and which further is not easily defeated.

Each of the foregoing objectives have been accomplished by our invention, one embodiment of which comprises a swivel caster including a hollow shaft extending from below the work platform base to a bearing into the space above the work platform base. The swivel caster includes a lock member movable between unlocked and locked positions to secure the wheel of the caster from rotating regardless of the orientation of the caster about its shaft. Extending from the lock is a flexible member which engages the caster shaft, and through an internal actuator, operates an electrical switch or transducer within the work platform base and communicating with the actuator as it extends above the caster shaft. Preferably the electrical switch or transducer is mounted adjacent to the top of the caster shaft for direct actuation. Linkages may be used for indirect actuation of the switch or transducer.

In one embodiment, the actuator comprises a plurality of trapped balls which are moved axially within the axial bore of the caster shaft depending upon the locked or unlocked condition of the caster.

In this embodiment, the operation of the lock causes extension of the flexible member and upward displacement of the trapped balls to actuate the switch into a safe or green light condition. This embodiment is tamper-resistant in that an attempt to disable this invention by removal of the flexible member results in automatic operation of the switch to unsafe or red-light condition.

In a second embodiment, the extension of the flexible member out of engagement with the trapped balls actuates the switch to a safe condition.

In a further embodiment, the flexible member is tapered at its end so that the displacement of the trapped balls is proportional to the amount of extenson of the flexible member. In such case, with an analog transducer in place of a simple switch, the system acts as an analog indicator of brake condition.

BRIEF DESCRIPTION OF THE DRAWING

This invention may be more clearly understood from the following detailed description and by reference to the drawing in which:

FIG. 1 is a perspective view of a typical work platform incorporating our invention;

FIG. 2 is a perspective view of another type of work platform with the work station elevated;

FIG. 3 is a simplified block diagram of the electrical operating circuit of the platforms of FIGS. 1 and 2 including this invention;

FIG. 4 is an enlarged side elevational view of a caster assembly including this invention;

FIG. 5 is a top plan view of the caster of FIG. 5;

FIGS. 6 and 6A are enlarged fragmentary sectional views taken along line 6—6 of FIG. 5;

FIG. 6B is a fragmentary sectional view taken along lines 6—6 of FIG. 5 of the device showing actuation of trapped balls by the flexible member.

FIG. 7 is a fragmentary side elevational view of an alternate form of flexible member in accordance with this invention.

DETAILED DESCRIPTION

This invention is best understood by showing it in a typical environment of an elevating work station designed for use principally in public buildings such as theaters or in industrial plants to elevate a worker safely for performing tasks such as maintenance of crane facilities, changing lighting, inspecting physical plant and equipment and other numerous tasks which must be performed above the floor level.

In FIGS. 1 and 2, two different types of such elevating work platforms may be seen. In FIG. 1, an elevating platform lift designed for use in theaters with sloping floors may be seen. This entire platform lift device designated 10, may be seen as including a base 11, mounted on three casters, a front central caster 12 which is steerable with a tow bar 13, and a pair of non-steerable height adjustable casters 14A and 14B, only one of which appears in FIG. 1. The platform lift 10 is, in this case, capable of straddling two rows of theater type seats or church pews with one caster 14A traveling in front of one row of seats, caster 12 traveling along the back of the same row and the second caster 14B traveling along behind the second row of seats. The two casters 14A and 14B are usually elevated by their respective cranks 15A and 15B to different levels matching the slope of the floor. The wheels 14A and 14B and cranks 15A and 15B are located on outriggers 16 which are usually pivoted on the frame 11 to adjust their separation to match the distance between two rows.

The base 11 supports a hydraulic or pneumatic vertical column or boom 16 which in turn supports a work platform 20 at heights varying, for example from 6 to 30 feet above the floor level. As shown in FIG. 1, the work platform 20 is at its maximum elevation and in dotted lines in its lowered position. Elevating apparatus 21 is located in the base portion 11. The casters 12 and 14 are lockable by respective locks indicated by their actuating levers 12a and 14a respectively. By the nature of the design and use of the platform lift of FIG. 1, the condition of the locks of the platform is not clearly visible to the operator on the work station 20 giving rise to the need for this invention.

In FIG. 2, a two column work lift device 30 is shown having a base 31 which is mobile on front wheels or casters 32 and rear wheels of casters 33. A work platform 34 is elevatable on a lifting mechanism such as a pair of telescoping columns 35 and 36. A control console 40 is shown in front of the operator 41 and is powered from the base 31 via electrical cable 42. One or more of the wheels 32 and 33 include locks, unshown in the drawing. For the safety of the operator 41, it is important for him to known if the locks on the wheels are, in fact, locked. This invention is instrumental in providing him that assurance.

The control console 40 of FIG. 2 provides the workman 41 with the necessary controls to perform the following functions:

1. travel forward (self propelled models only),
2. travel rearward (self propelled models only);
3. steering (self propelled models only);
4. elevate work station;
5. lower work station;
6. emergency stop
7. emergency lower.

In certain equipment an additional control is provided for electrically applying the locks.

As is apparent in FIGS. 1 and 2 the platform lifts 10 and 30 are transported on their wheels. The wheels 12 and 14 of the lift 10 of FIG. 1 and the wheels 32 and 33 of the lift 30 of FIG. 2 are journaled on horizontal axes better viewed in FIG. 4. The steerable wheels are usually pivoted on a king post which extends through a horizontal platform or frame member and are journaled for swiveling.

This invention involves an addition to the basic combination of FIGS. 1 and 2 or to other types of work stations or equipment in which there is a mechanically actuatable lock or lock system affixed to either the swivelable or the fixed caster wheels. Its greatest advantage is achieved when it is used in connection with swivelable caster wheels because the mechanism of this invention is compatible with a small space between the caster wheel and the caster king post.

Although this invention is disclosed in connection with a wheel brake or lock as may be seen in connection with FIGS. 4 through 6, it is equally useful with certain swivel locks sometimes found on swiveling casters or in combined swivel locks and wheel brakes as disclosed in U.S. Pat. Nos. 4,349,937, 4,205,413 and 3,828,392.

Now referring to FIG. 3, a simplified block diagram of the electrical circuitry of a work station such as illustrated in FIGS. 1 and 2 may be seen. The diagram applies to the more complicated case of a self-propelled lift. A manually-propelled lift is merely a special case in which the functions and interlocks pertaining to lift drive are deleted. The lift system employs AC or DC control power source 50, and a main power source illustrated by a lead or hydraulic line 51, which supplies energy to control motors or engines 55 as well as hydraulic pump motors 56 via the control panel 53 located on the console 40 of the work station 34 of the lift of FIG. 3. In certain applications, the electric brakes 57 may be actuated from the control panel 53 via the dashed line 58.

In normal operation, the operator will move the platform lifts 10 or 30 to the appropriate spot in the theater or plant for work to be performed. He will lock the locks on the main wheels of the platform or the outrigger, or both, while on the ground. He is then in a position to elevate the work station to the required height by the application of power to the motor 56 driving the hydraulic pump.

Prior to this invention, the foregoing could be accomplished even though the locks were not locked on the lift 10 or 30 and the worker 41 and his co-workers on the ground could be endangered by unintended movement of the work platform 10.

As may be seen in FIG. 3, control power to the control panel 53, drive engine or motors 55 and any hydraulic pump motor 56 passes via the caster lock switch 60 of this invention on leads 61 and 2 so that these functions may be switched off unless the lock of caster 13 is engaged.

Now referring to FIGS. 4 and 5 for more details of this invention, the caster 13 is shown with a wheel 42 journaled on axle 43 which is in turn supported on yoke or fork 44 mounted for swivel movement on a caster flange 45. The yoke 44 has a bearing plate 46 supported by suitable ball or other bearings. The caster flange 45 is secured to the underside of the base 11 work platform 10 shown in section with a circular opening 70 therethrough to receive the shaft 71 of the caster assembly 13. A lock assembly 72 includes a bracket 73 extending beyond the perimeter of the tire 42 and mounts a lock pad 74 which is cammed into and out of engagement with the surface of the tire 42 by lock actuator pedal 75. An arm 76 on the lock pedal 75 mounts a cable 80 enclosed within a protective cover 81 secured and directed by bracket 82 to a cable support 84 adjacent to the caster flange 46. The cable 80 is encased within the protective cover 81 which may be a helically wound wire cover in accordance with common practice in flexible cable actuators. The arm 76 moves with the foot lock pedal 75 from an unlocked position to a locked position while the cable 80 retreats to the position shown in FIG. 4. This effect is illustrated in FIG. 5.

In FIG. 4, an alternate position for the arm 76 and cable 80 is illustrated in dashed lines. If the arm 76 is so moved, the direction of locking and unlocking remains the same but actuation of the switch 60 to the green light or safe condition is accomplished only when the lock is engaged. Using this alternate position for the arm 76, removal of the cable 81, accidental or intentional will result in the switch 60 being thrown into the red-light position. The operator will be alerted or the lift mechanism disabled. This is a further form of protection.

Now referring to FIG. 6 in conjunction with FIGS. 6A and 6B, the actuator mechanism for switch 60 may be more clearly seen. It includes not only the cable 80 within its protective sleeve 81 and the receiver 84 but a caster bolt 85 secured by its nut 86. The caster bolt or king post 85 extends from a recess 87 in the caster flange 45 through the bearing plate 46 and extends below the nut 86. The caster bolt 85 has an axial opening 90 therethrough in which a pair of sleeves 91 and 92 are positioned to define an axial hole 93. The sleeve 92 is journaled for rotation within the king post 91. The axial hole 93 is dimensioned to receive an intermediate plunger consisting of a plurality of trapped movable members 95, for example, ball bearings. The ball bearings 95 are trapped in sleeves 91 and 92 by a screw 96 at the bottom and the switch actuator 60A at the top. The actuator 60A in one embodiment is the type which moves axially into the switch to open the switch and returns outward to close the circuit through the switch 60.

The end of cable 80 is shown rounded and directed towards an opening 100 in the wall of sleeve 92 whereby the cable 80 may intrude into the axial opening 100 of sleeve 91 and displace the trapped ball or movable members and bearings 95 upward a sufficient degree to actuate switch 60. The opening 100 extends through the sleeve 92 thereby providing an exit opening for the wire 80 and assurance that it properly displaces the balls 95. FIGS. 6A and 6B illustrate this movement more precisely. The cable 80 and sleeve 81 and protector 84 all move with the flange 46 and in turn with the yoke 44 of FIG. 4. Therefore, the cable 80 is always directed toward the opening 100 in the sleeve 92.

The switch 60 is identified as not only a switch but a transducer. It may be desirable that the switch 60 be replaced with an analog transducer and that the end of the wire 80 be tapered as illustrated in FIG. 6B. In such case, the extent to which the wire is inserted between the balls 95 determines the amount of actuation of the analog transducer, and in this application, indicates the degree of the actuation of the locks. The value "delta" indicated on FIG. 7 represents the maximum analog deviation for various degrees of wire movement.

CONCLUSION

We have developed a system which automatically interrupts selected functions in a work platform or other type of electrically controlled apparatus when a caster lock is not actuated. A principal advantage of the invention is that a switch is located electrically in the central circuit and mechanically positioned to be actuated via the axis of the caster. It works equally well with a swiveling caster or swiveled wheel as with a fixed caster. Switch operation is achieved by longitudinal movement along the axis of the caster shaft by displacable members such as ball bearings. A flexible cable operates not only to convey mechanical motion from the lock operator to the switch actuator but acts as the actual displacing member.

In the alternate temper-resistant embodiment of FIG. 4, any removal of the cable 80 causes the electrical circuit to be disabled just as if the locks were not operated.

The embodiments of this invention illustrated and described above are merely representative of the concept thereof and are not to be considered limiting. The patent monopoly granted hereunder instead is gauged by the following claims and their equivalents.

What is claimed is:

1. In a rotatable mechanical coupling including a hollow shaft having an axis of rotation and extending along the axis of rotation through a barrier and mounting lockable rotatable mechanical apparatus for rotation with respect to said barrier on one side thereof about said axis of rotation of said hollow shaft, the improvement comprising:

transducer means positioned on the opposite side of said barrier from said mechanical apparatus for indicating the locked or unlocked condition of the mechanical apparatus to be actuated via said hollow shaft;

a plurality of displaceable members within said hollow shaft;

means confining said plurality of displaceable members within said hollow shaft whereby said displaceable members are displaceable to actuate said transducer means;

flexible means having one end portion coupled to the mechanical apparatus mounted for rotation therewith and movable to the different positions dependent upon two different conditions of said mechanical apparatus, namely locked and unlocked positions;

said confining means including an opening therein positioned to allow a second end of said flexible means to enter said hollow shaft and displace said displaceable means dependent upon the position of said flexible means to cause actuation of said transducer at one of said conditions.

2. The improvement in accordance with claim 1 wherein said mechanical apparatus comprises a caster journaled wheel and brake and said flexible means is coupled to and rotatable with said caster dependent upon the actuation or non-actuation of said brake.

3. The combination in accordance with claim 1 wherein said confining means includes said opening in the side wall of the hollow shaft whereby said flexible means enters said hollow shaft transverse to its axis to displace said displaceable means.

4. The combination in accordance with claim 1 wherein said displaceable means comprises at least one ball and said flexible means bears transversely upon the curved surface of said ball to displace said ball and to activate said transducer.

5. The combination in accordance with claim 1 wherein said transducer responds to analog movement inputs and said flexible means includes a tapered region which serves to displace said displaceable means proportional to movement thereof.

6. The improvement in accordance with claim 1 wherein said mechanical apparatus comprises a mechanical lock engaging said wheel having an actuating lever adjacent thereto for engaging said mechanical lock;

said flexible means coupled to said actuating lever and through said barrier whereby said flexible means is moved responsive to movement of said actuating lever to displace said displaceable means and to actuate said transducer on the opposite side of said barrier from said mechanical apparatus.

7. In a rotatable mechanical coupling having a shaft extending through a barrier and supporting a mechanical assembly to operate on one side of said barrier, apparatus for indicating the condition of said mechanical assembly on the opposite side of said barrier comprising:

flexible actuator means coupled to said mechanical apparatus;

said flexible actuator means extended by two different amounts depending upon a condition of said mechanical apparatus;

a transducer secured to said coupling with an operator in juxtapositioned with said shaft;

the shaft of said rotatable coupling being hollow and fixedly sealed at one end and closed at the opposite end on the opposite side of said barrier by the operator of said transducer;

a plurality of displaceable members within the hollow of said shaft;

said shaft including a transverse opening extending through said hollow shaft;

said flexible actuator means extendable into and out of said transverse opening to force said displaceable members to move the operator of said transducer.

8. The combination in accordance with claim 7 wherein said transverse opening extends through said shaft and wherein said flexible actuator means may extend through the hollow of said shaft.

* * * * *